United States Patent Office 2,892,676
Patented June 30, 1959

2,892,676
IMPROVED PROCESS OF PLUTONIUM CARRIER PRECIPITATION

Burt F. Faris, Chatham, Pa., assignor to the United States of America as represented by the United States Atomic Energy Commission No Drawing. Application February 8, 1952
Serial No. 270,737

7 Claims. (Cl. 23—14.5)

This invention deals with the recovery of the so-called fission product values and/or of plutonium values from aqueous mineral acid solutions containing plutonium together with fission product values and/or with uranium values, and the invention deals partly with the recovery of the fission product values and/or the plutonium values by precipitation on a bismuth phosphate carrier.

It is known that natural uranium, when bombarded with slow neutrons, forms $Pu^{239}$ and elements having atomic numbers between 30 and 64, the so-called fission products. The fission products emit harmful $\gamma$-rays and thus "contaminate" the plutonium. For this reason it is advantageous to separate the fission product values from the plutonium or to decontaminate the plutonium. The recovery of fission product values, moreover, is frequently desirable per se, since they are being used nowadays for many scientific and industrial purposes, for instance, for medical studies and applications.

For the purpose of processing neutron-irradiated uranium, it is usually first dissolved in mineral acid, for instance, in nitric acid. The so-called dissolver solutions obtained thereby contain predominantly uranium and also plutonium and fission products in, however, very low relative and absolute concentrations, which makes the quantitative recovery of the fission products as well as that of the plutonium difficult. For instance, precipitation of these values in the form of insoluble compounds is either impossible or highly unsatisfactory, because these elements are usually present in such small quantities that even, when converted to such "insoluble" compounds, they are still within the range of solubility. For this reason one has resorted to the so-called carrier precipitation which comprises providing macro-quantities of a foreign insoluble compound in the solutions which entrains or "carries" the "insoluble" compounds of plutonium and/or fission products. Bismuth phosphate is one of the best suitable carriers for this purpose and has been used frequently.

Bismuth phosphate can be added as a preformed precipitate or it can be formed in the solution by adding an acid-soluble bismuth salt, e.g., bismuth nitrate or bismuth subnitrate, and a soluble substance containing the phosphate anion, e.g., phosphoric acid. The latter method is preferred.

Bismuth phosphate carries tetravalent plutonium, but it does not carry the hexavalent plutonium. The fission product values are partly carriable and partly not. These facts form the basis for a process preferably used in the separation of the compounds of the dissolver solutions by carrier precipitation on bismuth phosphate. The fundamentals of one embodiment of the carrier precipitation process are now being described.

A dissolver solution obtained by dissolving neutron-irradiated uranium in nitric acid, or in a mixture of nitric acid and sulfuric acid, contains hexavalent uranium, tetravalent plutonium and fission product values. Soluble bismuth and phosphate anions-containing substances, for instance bismuth nitrate and phosphoric acid, are added to the solution whereby a bismuth phosphate precipitate forms which carries the tetravalent plutonium values and part of the fission product values, while the hexavalent uranium values remain in solution with the remainder of the fission product values. This part of the process is usually referred to as the "extraction."

The carrier precipitates obtained are then separated from the solution, for instance by filtration, decantation or centrifugation and dissolved in concentrated nitric acid. The plutonium is then converted to the non-carriable hexavalent state by adding an oxidizing agent, such as potassium dichromate or sodium bismuthate.

The oxidized solution is then treated for carrier precipitation. Since sufficient bismuth and phosphate ions are still present from the first precipitate, the addition of a carrier is not necessary, and precipitation may be accomplished by merely diluting the solution with water whereby the acidity is reduced. However, it is optional to add phosphoric acid in order to insure complete precipitation. This step of the process is usually referred to as the "by-product precipitation."

Separation in this by-product precipitation step can be improved by carrying it out in the presence of one or several "scavenging" substances, such as zirconium phosphate, columbic oxide, and lanthanum fluoride which coprecipitate with the carrier so that a mixture of the scavenger plus a carrier precipitate actually is present for the removal of the fission product values from the solution.

This by-product precipitate obtained by dilution of, and/or addition of phosphoric acid to, the solution does not carry plutonium, since the plutonium was present in the non-carriable hexavalent state. Thus, the bismuth phosphate carries only the fission product values of the first extraction precipitate. The supernatant, which contains the plutonium and a relatively small amount of fission products, is then separated from the precipitate.

The plutonium in this separated solution is then reduced to bring it back into the carriable tetravalent state. Ferrous ions, hydrogen peroxide, and sulfur dioxide, for instance, are suitable reducing agents for this purpose. To the reduced solution, bismuth and phosphate ions are again added whereby a precipitate is obtained which carries the tetravalent plutonium, while the bulk of the fission product values remains in solution. This part of the process is generally called the "product precipitation," and the by-product precipitation and the product precipitation together form the so-called decontamination cycle.

This, in brief, is one embodiment of the separation process as it has been used heretofore. Separation, however, was not complete after one cycle, and in particular, due to the use of scavengers, an average plutonium loss of about 1.5% occurred, so that a repetition of the entire cycle for further decontamination or separation was often considered necessary.

It is an object of this invention to provide a process for the separation of plutonium from fission product values by which the above mentioned disadvantage is overcome.

It is an object of this invention to provide a process for the recovery of plutonium from dissolver solutions by which a very high degree of decontamination is obtained in the first decontamination cycle.

It is also an object of this invention to provide a process for the recovery of plutonium values from solutions containing them together with fission product values in which the use of a scavenger is not necessary and thus the loss of plutonium values and the necessity for repeating the decontamination cycle are reduced.

These and other objects are accomplished by forming in an aqueous nitric acid solution which contains tetravalent plutonium and fission product values a bismuth phosphate precipitate in the presence of fluomolybdic acid anions. The invention is particularly valuable when applied to the product precipitation step.

Three types of fluomolybdic acids were found to be suitable for the process of this invention, namely, those of the formulae, $HMoO_2F_3$; $H_2MoO_2F_4$; and $HMoOF_5$. The free acids are suitable; however, the ammonium, sodium, and potassium salts, which are water soluble, also yielded satisfactory results. While the concentration of fluomolybdic anions may vary widely, a concentration of about 0.05 M was preferred.

Fluomolybdic acid exerts a complexing effect on bismuth phosphate and therefore delays bismuth precipitation. It was found that precipitation of bismuth phosphate does not set in in the presence of fluomolybdic compounds until the phosphate anion concentration has reached a value of 0.3 M. For this reason it was found advantageous first to add the phosphoric acid in a quantity resulting in a concentration of 0.3 M, then incorporating the bismuth salt into the solution, and thereafter adding more phosphoric acid so as to yield a total concentration of about 0.6 M.

For precipitation the solution is preferentially heated, and a temperature range between 65° and 85° C. has been found suitable, while about 75° C. was preferred. After precipitation, it is advisable to agitate the mixture and "digest" it for about two hours whereby precipitation is brought to completion. Thereafter the mixture is allowed to cool; separation of the precipitate formed may be carried out by any means known to those skilled in the art.

In the following, one example of the process of this invention is given without the intention to limit the invention to the specific details given therein.

*Example*

Three parallel series of tests were carried out, each consisting of three experiments on bismuth phosphate carrier precipitation. The procedure of the various steps followed closely the outlines given above for the embodiment usually employed. In each series, one so-called control experiment was carried out in which no scavenger and no complexing agent were used. In each second experiment, 0.05 M fluosilicate was present during product precipitation, while in each third experiment the solution contained 0.05 M fluomolybdic anion during product precipitation. The precipitations of the latter two series were also made from scavenger-free solutions. The results are compiled in the table below.

| Added Agent | Decontamination Factor For Product Precipitation Step | Decontamination Factor For Cycle | Decontamination Factor for Cycle Plus Extraction |
|---|---|---|---|
| Control | 4.0 | 19.2 | 129 |
| 0.05 M Fluosilicate | 8.4 | 40.6 | 272 |
| 0.05 M Fluomolybdate | 84.4 | 407 | 2,725 |
| Control | 4.2 | 29.4 | 218 |
| 0.05 M Fluosilicate | 7 | 49 | 363 |
| 0.05 M Fluomolbydate | 54 | 378 | 2,787 |
| Control | 6 | 23.4 | 138 |
| 0.05 M Fluosilicate | 18 | 70.2 | 420 |
| 0.05 M Fluomolybdate | 51 | 199 | 1,196 |

From these data it is obvious that a great improvement is attained by the process of this invention and that in the product precipitation step, due to the presence of fluomolybdate an increase of the decontamination factor is obtained by amounts ranging from approximately 700 to 2000% over that obtained in the control experiment and of from about 200 to 900% over that obtained with fluosilicate.

It will be understood that this invention is not to be limited to the specific details given herein but that it may be modified within the scope of the appended claims.

What is claimed is:

1. In a process of separating tetravalent plutonium values from fission product values contained in aqueous nitric acid solutions by selective precipitation of the plutonium on a bismuth phosphate carrier, the step of adding fluomolybdate acid anion to said solutions prior to incorporating the carrier.

2. The process of claim 1 wherein the fluomolybdate acid anion is present in the solution in a concentration of approximately 0.05 M.

3. The process of claim 1 wherein the fluomolybdate acid anion is $MoO_2F_3^-$.

4. The process of claim 1 wherein the fluomolybdate acid anion is $MoO_2F_4^=$.

5. The process of claim 1 wherein the fluomolybdate acid anion is $MoOF_5^-$.

6. The process of claim 1 wherein precipitation is carried out at a temperature of from 65° to 85° C., and the mixture, after precipitation, is allowed to digest for about two hours while being agitated.

7. A process of separating tetravalent plutonium values from fission product values contained in an aqueous nitric acid solution comprising heating the solution to about 75° C., adding phosphoric acid in a quantity to yield a concentration of about 0.3 M, adding fluomolybdate acid anion in a quantity to yield a concentration of about 0.05 M, adding an acid-soluble bismuth salt, adding an additional quantity of phosphoric acid so as to obtain a concentration of about 0.6 M, agitating the solution while still at elevated temperature for approximately two hours whereby precipitation of the plutonium values on the bismuth phosphate is brought to completion while the fission product values remain in solution, and separating the precipitate from said solution.

References Cited in the file of this patent

Smyth: "A General Account of the Development of Methods of Using Atomic Energy for Military Purposes Under the Auspices of the United States Government," p. 100 (1945). Supt. of Doc., Washington 25, D.C.